United States Patent [19]

Duppui et al.

[11] Patent Number: 4,787,249

[45] Date of Patent: Nov. 29, 1988

[54] DIFFERENTIAL PRESSURE TRANSDUCER

[75] Inventors: Hans Duppui, Stuttgart; Leo Nawrocki, Waiblingen; Rolf Specht, Leonberg; Werner Winter, Stuttgart, all of Fed. Rep. of Germany

[73] Assignee: Eckardt AG, Stuttgart, Fed. Rep. of Germany

[21] Appl. No.: 53,694

[22] Filed: May 26, 1987

[30] Foreign Application Priority Data

Jun. 28, 1986 [DE] Fed. Rep. of Germany ....... 3621795

[51] Int. Cl.⁴ .................... G01L 19/00; G01L 9/04
[52] U.S. Cl. .................................. 73/708; 73/720; 338/4
[58] Field of Search ............... 73/708, 717, 720, 721, 73/716, 718, 722, 706; 338/4

[56] References Cited

U.S. PATENT DOCUMENTS

| | | | |
|---|---|---|---|
| 3,021,670 | 2/1962 | Boles et al. | 73/716 |
| 3,067,614 | 12/1962 | Rich | 73/722 |
| 3,277,719 | 10/1966 | Prell | 73/722 |
| 3,444,736 | 5/1969 | Stedman | 73/720 |
| 4,120,206 | 10/1978 | Rud, Jr. | 73/718 |
| 4,599,906 | 7/1986 | Freud et al. | 73/708 |

FOREIGN PATENT DOCUMENTS

| | | | |
|---|---|---|---|
| 3341987 | 5/1985 | Fed. Rep. of Germany. | |
| 122126 | 9/1980 | Japan | 73/721 |
| 553499 | 4/1977 | U.S.S.R. | 73/720 |

*Primary Examiner*—Stewart J. Levy
*Assistant Examiner*—Robert R. Raevis
*Attorney, Agent, or Firm*—Burns, Doane, Swecker & Mathis

[57] ABSTRACT

A differential pressure transducer determines a differential between two pressures. The transducer comprises a closed measuring chamber formed by at least two measuring membranes arranged to be acted upon by the two pressures, respectively. At least one pressure chamber is defined by a transmission membrane and one of the measuring membranes. A bendable bar is disposed in the pressure transmission chamber, i.e., outside of the measuring chamber, and is operably connected to the measuring membranes to be bent thereby in response to a pressure differential. Strain gauges are mounted on the bendable bar for detecting the amount of bending of the bar, thereby enabling the pressure differential to be determined.

5 Claims, 2 Drawing Sheets

4,787,249

DIFFERENTIAL PRESSURE TRANSDUCER

BACKGROUND AND OBJECTS OF THE INVENTION

The invention concerns a differential pressure transducer wherein a change in pressure produces a bending of an internal part. The amount of bending is measured to provide an indication of the amount of the pressure change.

It is conventional for such a differential pressure transducer to include a closed measuring chamber formed by at least two measuring membranes which are interconnected by means of a coupling part. The coupling part is connected to a bending bar to bend the latter so that the extent of such bending can be measured to provide an indication of the amount of the pressure change.

Known difference pressure transducers of this type operate on the so-called single chamber principle in which the bending bar is located within the measuring chamber formed by the two measuring membranes and is indirectly connected to both membranes by the coupling part. The measuring chamber is filled with a liquid and since it contains the bending bar, it has a relatively large volume. This volume varies with temperature so that the measured values of the known differential pressure transducer are strongly temperature dependent. Furthermore, during such volume changes and in case of an overload, the measuring membranes are severely stressed. In addition, careful attention must be given in the selection of materials for the known transducer if the pressure media to which the measuring membranes are exposed comprise an aggressive liquid or the like. In such a case, the types of material (and thus the properties of the membranes) which can be chosen are limited.

Differential pressure transducers operating under the so-called two-chamber principle, are also known (see German Pat. No. 33 41 987). In such differential pressure transducers, the movement of the measuring membranes separating the two measuring chambers are measured, for example, by means of a path measuring system or a force measuring system. A particular problem regarding the two-chamber difference pressure transducers involves the fact that the measuring membranes must be protected against excessive stretching in both directions.

It is an object of the invention to provide a differential pressure transducer that is largely independent of temperature and which contains a measuring membrane protected against overloads in a simple manner.

SUMMARY OF THE INVENTION

This object is achieved by the present invention which relates to a differential pressure transducer for measuring a differential between two pressures. The transducer comprises a closed measuring chamber formed by at least two measuring membranes arranged to be acted upon by the two pressures, respectively. The measuring chamber contains a fluid medium. A transmission membrane is provided which is exposable to one of the pressures. At least one pressure transmission chamber is defined by the transmission membrane and one of the measuring membranes. The transmission chamber contains a fluid medium. A bendable bar is disposed in the pressure transmission chamber and is operably connected to the measuring membranes to be bent thereby in response to a pressure differential. Means is provided which is responsive to the bending of the bar for determining the amount of the pressure differential.

By locating the bending bar in the transmission chamber, it is possible to minimize the volume of the measuring space. The temperature dependence and the stress on the membranes of the differential pressure transducer is thereby significantly reduced. Further, with an appropriate selection of fill liquids, the material of the measuring membrane located between the transmission chamber and the measuring chamber may be chosen from a wide variety of materials.

Preferably, an additional pressure transmission chamber is provided which is defined by an additional transmission membrane and another of the measuring membranes. The additional transmission membrane is exposable to another of the pressures. As a result, the material from which such other measuring membrane can be formed can be selected from a wide variety of materials.

Preferably, the transmission chambers are of identical volume. Therefore, possible volume variations caused by changes in temperature ar compensated for.

Preferably, a fixed surface is disposed opposite each of the measuring and transmission membranes for limiting the extent to which such membranes can be deformed. Thus, the membranes are protected against damage due to excessive pressures.

BRIEF DESCRIPTION OF THE DRAWINGS

The objects and advantages of the invention will become apparent from the following detailed description of preferred embodiments thereof in connection with the accompanying drawings, in which like numerals designate like elements, and in which.

DETAILED DESCRIPTION OF PREFERRED EMBODIMENTS OF THE INVENTION

Figure 1:
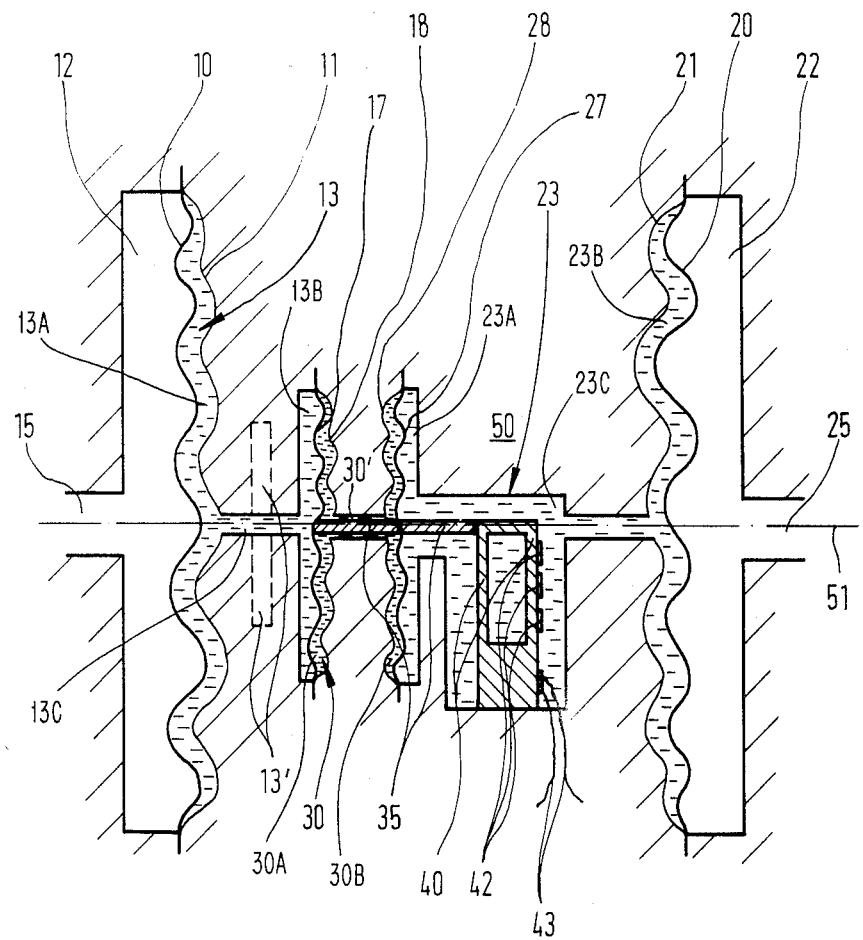
FIG. 1 is a longitudinal sectional view through a differential pressure transducer according to the present invention.

A differential pressure transducer shown in FIG. 1 essentially comprises a base body 50 having a longitudinal axis 51.

The base body 50 and a first transmission membrane 10 together form a first pressure chamber 12, which may be exposed by means of a pressure conduit 15 to a pressure medium. The transmission membrane 10 is wave-shaped and joined fixedly at its edges to the base body 50. On the side of the transmission membrane 10 facing away from the pressure chamber 12 a first transmission chamber 13 is located. That chamber 13 comprises first and second transmission chamber portions 13A, 13B interconnected by a channel 13C. The first chamber portion 13A is defined by the transmission membrane 10 and a surface 11 of the base body 50. That surface 11 has a wavy configuration and forms a membrane bed, with the wave shapes of the membrane bed 11 and the transmission membrane 10 being adapted to each other, i.e., being parallel. The waviness of the membrane bed 11 is intended to reduce the volume of the transmission chamber 13.

The second transmission chamber portion 13B faces a first measuring membrane 17. The measuring membrane 17 has a wavy configuration and is fixedly clamped at its edges in the base body 50. A measuring chamber 30 is provided which is of H-shaped configuration in longitudinal section. That measuring chamber 30 comprises first and second measuring chamber portions 30A, 30B which are interconnected by a connecting channel 30'. The measuring chamber portion 30A is disposed on the side of the first measuring membrane 17 facing away from the first transmission chamber 13, which measuring chamber portion 30A is delineated by the measuring membrane 17 and a surface 18 of the base body 50. The surface 18 is a wave-shaped bed which protects the measuring membrane 17 against overloads. The membrane 17 comes to rest against the membrane bed 18 in case of excessive pressures in the transmission chamber 13. The distance between the measuring member 17 and the membrane bed 18 is such that the measuring membrane 17 is not stretched past its elastic limit, thereby retaining its spring properties. The measuring membrane 17 has a smaller surface area than the transmission membrane 10. The measuring membrane 17 and the transmission membrane 10 are approximately parallel to each other.

The measuring chamber 30 includes a second measuring membrane 27 corresponding to the first measuring membrane 17. The two measuring membranes 17, 27 are placed in mirror symmetry relative to each other and provided with similar configurations and dimensions and in particular, possess the same spring constants. They are thereby connected symmetrically with respect to each other regarding their function.

The measuring membrane 27 and an associated membrane bed 28 are placed in mirror symmetry relative to the measuring membrane 17 and the membrane bed 18. The symmetry plane is located perpendicularly to the longitudinal axis 51 between the measuring membranes 17, 27. The two measuring membranes 17, 27 are connected with each other by means of a coupling part 35. The coupling part 35 is located in the connecting channel 30' which interconnects the measuring chamber portions 30A, 30B and has its ends fastened approximately in the center of the measuring membranes 17, 27.

On the side of the measuring membrane 27 facing away from the measuring chamber portion 30B, a second transmission chamber 23 is located. The second transmission chamber includes third and fourth chamber portions 23A, 23B interconnected by an enlarged portion 23C. The chamber 23 corresponds essentially to the first transmission chamber 13, and is disposed between the measuring membrane 27 and a second transmission membrane 20 which corresponds to the first transmission membrane 10. A bending bar 40 is contained within the enlarged chamber portion 23C. The second transmission membrane 20 and its associated membrane bed 21 are arranged as symmetrical mirror images relative to the first transmission membrane 10 and its associated membrane bed 11. The symmetry plane is perpendicular to the longitudinal axis 51 but does not correspond to the symmetry plane with which the measuring membranes 17, 27 are associated. The same is true for a second pressure chamber 22 located on the side of the transmission membrane 20 facing away from the transmission chamber 23. The second pressure chamber 22 is exposable to a pressure medium by means of a pressure conduit 25.

The bending bar 40 located in the transmission chamber 23 is fixedly connected with the base body 50. In the preferred embodiment shown, the bending bar 40 has an elongated rectangular cross-section and is coupled by means of the coupling part 35 with the two measuring membranes 17, 27. Strain gauges 42 are applied in a known manner to the bending bar 40, the electrical resistance of which may be detected by means of wires 43. The strain gauges 42 and thus their electrical resistances may be arranged in a known manner in the form of a Wheatstone bridge.

The two transmission chambers 13, 23 have identical volumes. This may be achieved, for example, by means of equalizing chambers 13' communicating with the first transmission chamber 13. The two transmission chambers 13, 23 are filled with the same liquid, for example silicone oil. The measuring chamber 30 is also filled with a liquid medium, for example silicone oil. The measuring membranes 17, 27 and the transmission membranes 10, 20 comprise the same material.

The pressurized medium located in the first pressure chamber 12 acts on the transmission membrane 10. The pressurized medium located in the second pressure chamber 22 acts on the transmission membrane 20. If the pressure in chamber 12 rises relative to the pressure in chamber 22 there will occur a displacement of all membranes to the right. Simultaneously, the coupling part 35 is also displaced and the bending bar 40 is bent toward the right. The deflection of the bending bar 40, in turn, results in a change in the length of the strain gauges 42 and a resultant variance in their electrical resistance. The change in resistance may be detected by means of the wires 43 and displayed by an appropriate electric circuit as the differential pressure or a function of the differential pressure.

By locating the bending bar 40 outside of the measuring chamber 30, it is possible to limit the volume of the measuring chamber 30 to a minimum. Consequently, fluctuations in temperature cause only slight volume changes of the liquid medium in the measuring chamber 30. Since it is virtually impossible to provide both measuring membranes with an identical stiffness, a thermal expansion of the fluid in the measuring chamber will produce different movements of those membranes. The temperature dependence of the differential pressure transducer may thereby be limited to a minimum. Additionally, smaller membranes may be provided.

As the two measuring membranes 17, 27 are surrounded on both sides by known liquids, for example silicone oil, it is possible to freely select the material of the measuring membranes 17, 27, in particular to use better spring materials or the like for the two measuring membranes. The measuring accuracy and the measuring range of the difference pressure transducers can thereby be optimized.

Since the differential pressure transducer is provided with two measuring membranes 17, 27, each of them is exposed to one-half of the differential pressure. It is possible therefore to make the two measuring membranes 17, 27 relatively large.

In view of the location of the bending bar 40 within the transmission chamber 23 rather than in the pressure chambers 12, 22, it is possible to form the bending bar 40 from a wide variety of materials since it is not exposed to potentially aggressive pressure media. Particular, if silicone oil is used as the fill liquid for the transmission chambers 13, 23, materials may be employed for the bending bar 40 regardless of their sensitivity to corrosion, since no risk of corrosion will exit.

FIG. 1 is a longitudinal section through a differential pressure transducer formed by circular disks 70 to 75 placed against each other. Between the disks 70 to 75 are arranged membranes 110, 117, 127, 120 which correspond in function to the membranes 10, 17, 27, 20. A bending bar 140 is located and held in a pocket or the like of the disk 73.

It is possible by means of the disk arrangement to assemble the differential pressure transducer in sequential production steps. The operation of each structural group may thereby be tested individually after each step of the assembly process.

Figure 2:
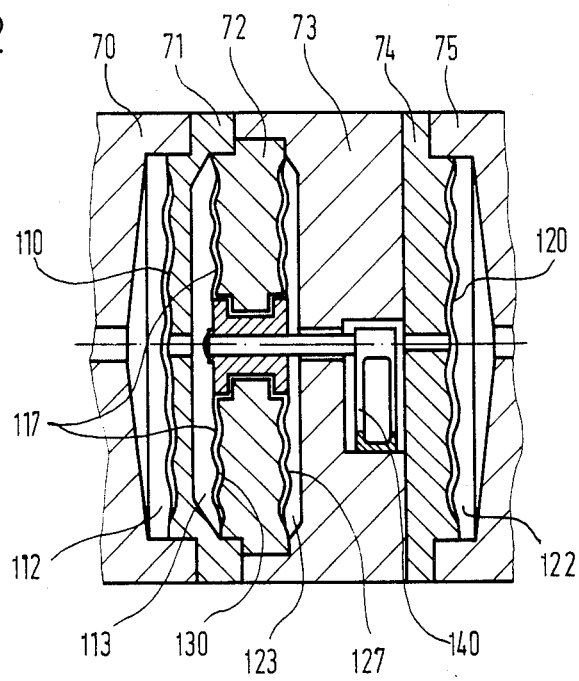
FIG. 2 is a view similar to FIG. 1 of a modified transducer.
Figure 3:
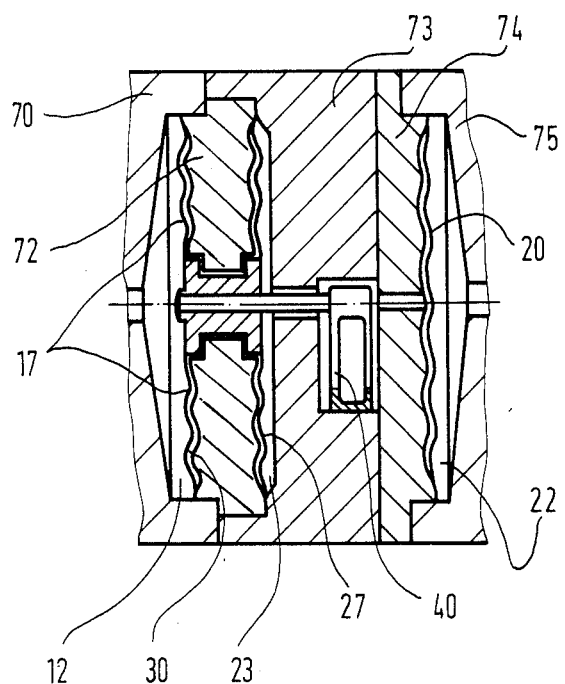
FIG. 3 is a view similar to FIG. 2 of yet another modified transducer.

It is further possible due to the disk configuration to alter the differential pressure transducer in a simple manner. Thus, for example, the differential pressure transducer shown in FIG. 3 differs from that of FIG. 2 only in that the disk 71 has been removed and the disk 70 has been set against the disks 72, 73. This is feasible without difficulty with appropriately adapted diameters. Furthermore, the transmission membrane 10 is not present in the differential pressure transducer of FIG. 3. This omission is made possible, in particular, in the case of large differences between the pressures in the pressure chambers 12, 22. As a precondition of a high measuring accuracy in this case, the pressure rise in the transmission chamber resulting from the change in volume of the full liquid and the rigidity of the transmission membrane should be negligible or be compensated for, such as by temperature dependent elements in the electrical processing.

Although the present invention has been described in connection with preferred embodiments thereof, it will be appreciated by those skilled in the art that additions, modifications, substitutions, and deletions not specifically described may be made without departing from the spirit and scope of the invention as defined in the appended claims.

What we claim is:

1. A differential pressure transducer for measuring a differential between two pressures, said transducer comprising:

a closed measuring chamber formed by at least two deformable measuring membranes arranged to be acted upon by said two pressures, respectively, said measuring chamber containing a fluid medium, said measuring membranes being of identical size and shape and arranged as symmetrical mirror images of one another, a first deformable transmission membrane exposable to one of said pressures, a first pressure transmission chamber defined by said first transmission membrane and one of said measuring membranes, said first transmission chamber containing a fluid medium, a second deformable transmission membrane exposed to the other of said pressures, a second pressure transmission chamber defined by said second transmission membrane and the other of said measuring membranes, said first and second pressure transmission chambers having the same volume and arranged as symmetrical mirror images of one another, first and second fixed surfaces located opposite said first and second measuring membranes, respectively, for limiting the extent to which said measuring membranes can be deformed, third and fourth fixed surfaces located opposite said first and second transmission membranes, respectively, for limiting the extent to which said transmission membranes can be deformed, the volume of said measuring chamber being less than the volume of either of said pressure transmission chambers, measuring means disposed in said second pressure transmission chamber and operably connected to both of said measuring membranes to be activated thereby in response to a pressure differential, and means responsive to the activation of said measuring means for determining said pressure differential.

2. A differential pressure transducer according to claim 1, wherein each of said transmission membranes has a surface area at least as great as that of each of said measuring membranes.

3. A differential pressure transducer according to claim 1, wherein said fluid media are liquid.

4. A differential pressure transducer according to claim 1, wherein said measuring means comprises a bendable bar which is bent in response to said pressure differential, said means for determining said pressure differential being responsive to the bending of said bar and comprising strain gauges mounted on said bar.

5. A differential pressure transducer according to claim 1, wherein a plane of symmetry of said measuring membranes is non-coincident relative to a plane of symmetry of said pressure transmission membranes.

* * * * *